Patented Mar. 9, 1926.

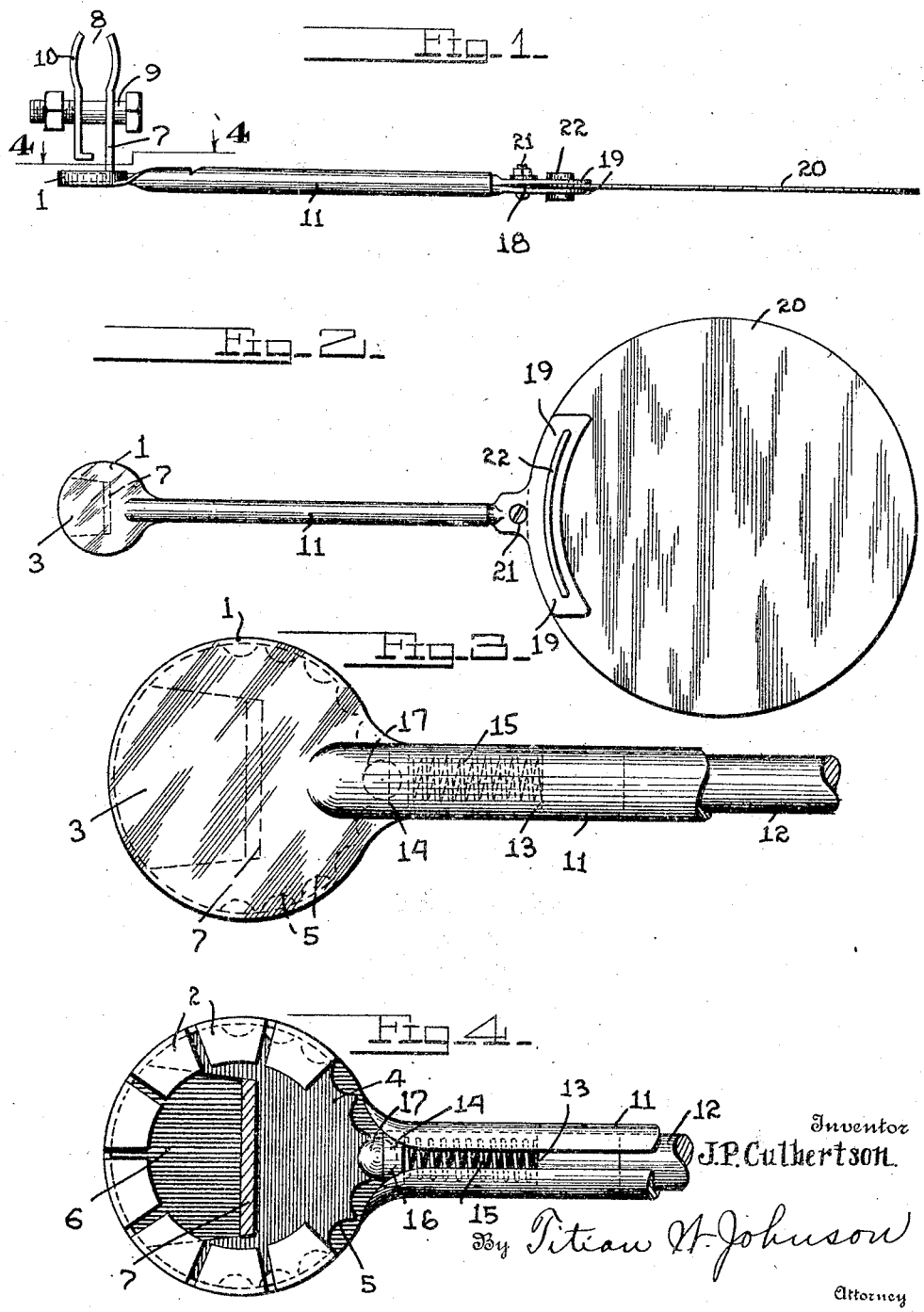

1,576,094.

UNITED STATES PATENT OFFICE.

JAMES P. CULBERTSON, OF ALLENTOWN, PENNSYLVANIA.

GLARESHIELD.

Application filed May 9, 1924. Serial No. 712,016.

*To all whom it may concern:*

Be it known that I, JAMES P. CULBERTSON, a citizen of the United States, residing at Allentown, in the county of Lehigh and State of Pennsylvania, have invented certain new and useful Improvements in Glareshields, of which the following is a specification.

This invention relates to improvements in glare shields, and has special reference to shields of this character for use on automobiles.

An object of the invention is to provide a shield of this character readily adapted for convenient attachment to some stationary portion of the automobile in advance of the driver's seat, as for instance, to the side bar of the wind shield, to be in any event in position for ready manipulation by the operator, and which may be quickly manipulated for the purpose of protecting the driver from the glare of the headlights of a car approaching from the opposite direction.

It is well known that many serious accidents result from the driver of one car being blinded by the intense glare from the lamps of approaching cars, and therefore, one of the objects of this invention is to provide a simple, durable and easily operable device for protecting the driver from this glare, and consequently lessen the liability or likelihood of accidents.

A further object of the invention is to so construct the device that it may be cheaply and easily manufactured, and at the same time be durable and sightly and attachable to such parts of the car as will make it in no way interfere with the intended operations of other parts, attachments or devices.

The invention contemplates for the shield proper, the use of glass properly toned or shaded so as to reduce or modify the rays of light from the lamps of another car to a point where they will not interfere with the safe driving of the car to which the shield is attached. At the outset, I will say that I do not desire to limit myself to the use of any particular material for the shield proper, and any material other than glass suitable for the purpose may be employed.

In the drawings illustrating the invention—

Fig. 1 is an edge elevation.

Fig. 2 is a plan.

Fig. 3 is a plan enlarged, parts being broken away, of the head and a portion of the sleeve or tube and cylindrical rod which fits in the tube.

Fig. 4 is a view similar to Fig. 3, but reversed.

Referring to the drawings, the numeral 1 designates what I will term the head of the device. This is preferably circular in form, and made from sheet metal, and is provided with a series of ears 2 circularly arranged and bent to extend parallel to the flat side 3. These ears 2 form retaining means for a disk 4 provided with a series of circular notches or seats 5, the seats extending preferably throughout a little more than half of the periphery of the disk. This disk lies flat against the side 3 of the head, and is provided at one point with a tab 6, which is bent down upon and lies flat upon the disk 4. This tab is then bent sharply at right angles to form one element 7 of a clamp 8. The jaw 7 is apertured for the passage of a short headed and nutted bolt 9 which carries on its shank the other element 10 of the clamp 8. By means of this clamp, obviously, the whole device may be conveniently attached to any suitable part of the car or vehicle upon which the protector or shield is used.

Integral with the head and preferably stamped from the same piece of metal is a sleeve 11 which receives the tubular rod 12, which rod is snugly fitted and held within the sleeve. Between the end 13 and a plug 14 is interposed a spiral spring 15, which is provided with a spherical pocket 16 in which is seated a ball 17 adapted, as best shown in Fig. 4, to occupy one or the other of the circular seats or notches 5 in the disk 4 according to the position of the protector proper when in use. It will be understood that the plug 14 is slidable in the throat of the sleeve 11 so that it can move back together with the ball against the influence of the spring 15 when the position of the shield is being changed or adjusted.

The rod 12 is bifurcated at the end opposite the head, as shown at 18, and is provided with lateral extensions 19, thereby forming a clamp, the jaws of which snugly embrace the circular protector element 20, which as before suggested, may be of glass or other suitable material toned or shaded to protect the sight of the driver from the glare. The jaws of this clamp are made to grip tightly the element 20 by a short headed and nutted bolt 21, and these jaws are preferably stiffened by a stiffening rib 22.

The obviousness of the operation of the device, on account of its simplicity, has possibly already become apparent. Nevertheless it will be said that after the device as a whole is firmly clamped to a suitable or appropriate part of the automobile by the proper adjustment of the jaws of the clamp 8 and the tightening of the same by the bolt 9, the position of the shield may be very readily changed as the exigencies of the case may require, by simply grasping the sleeve 11 at any convenient point, and exerting a pressure sufficient to move the movable parts of the device in one direction or the other, the ball 17 in such manipulation being jumped under the influence of the spring 15 into one or the other of the notches or pockets 5, the spring and ball serving to hold the shield in adjusted position when the hand is removed.

It will be understood that the ears 2 are bent down snugly upon the tab 6, but not so snugly of course as to prevent the ears from riding over the tab in the manipulation of the shield, the tab and disk being, it will be seen, the stationary parts of the device.

Claims:

1. A device of the character described, comprising a notched disk, a clamped element rigidly secured to said disk and adapted to secure the same to an appropriate part of a vehicle, a head revolvable around said disk and provided with a tubular extension, said head being provided with a plurality of ears that overlap the disk serving to keep it positioned in the head, a glare protector element having a rod secured thereto extending into the tubular extension of the head, a plug in the throat of the tubular extension adjacent the head, a spiral spring interposed between the plug and the end of the rod, and a ball seated in the plug and adapted to engage one or another of the notches in the disk.

2. A glare protector comprising a notched disk having a clamped element secured thereto comprising a fixed arm extending at right angles to said disk, a clamped bolt carried by said element, and a second clamping element carried by and movable on the bolt, whereby the disk may be secured to an appropriate stationary part of a vehicle, a head revolvable around said disk and formed with a flange overlapping said disk, whereby said disk is held positioned within the head, a glare protector element having a rod secured thereto and adapted for longitudinal adjustment in said extension, means carried by the head and adapted to engage one or another of the notches in the disk, and resilient means interposed between said means and the end of the adjustable rod whereby said means are held in one or another of said notches.

In testimony whereof I affix my signature.

JAMES P. CULBERTSON.